United States Patent Office 3,597,464
Patented Aug. 3, 1971

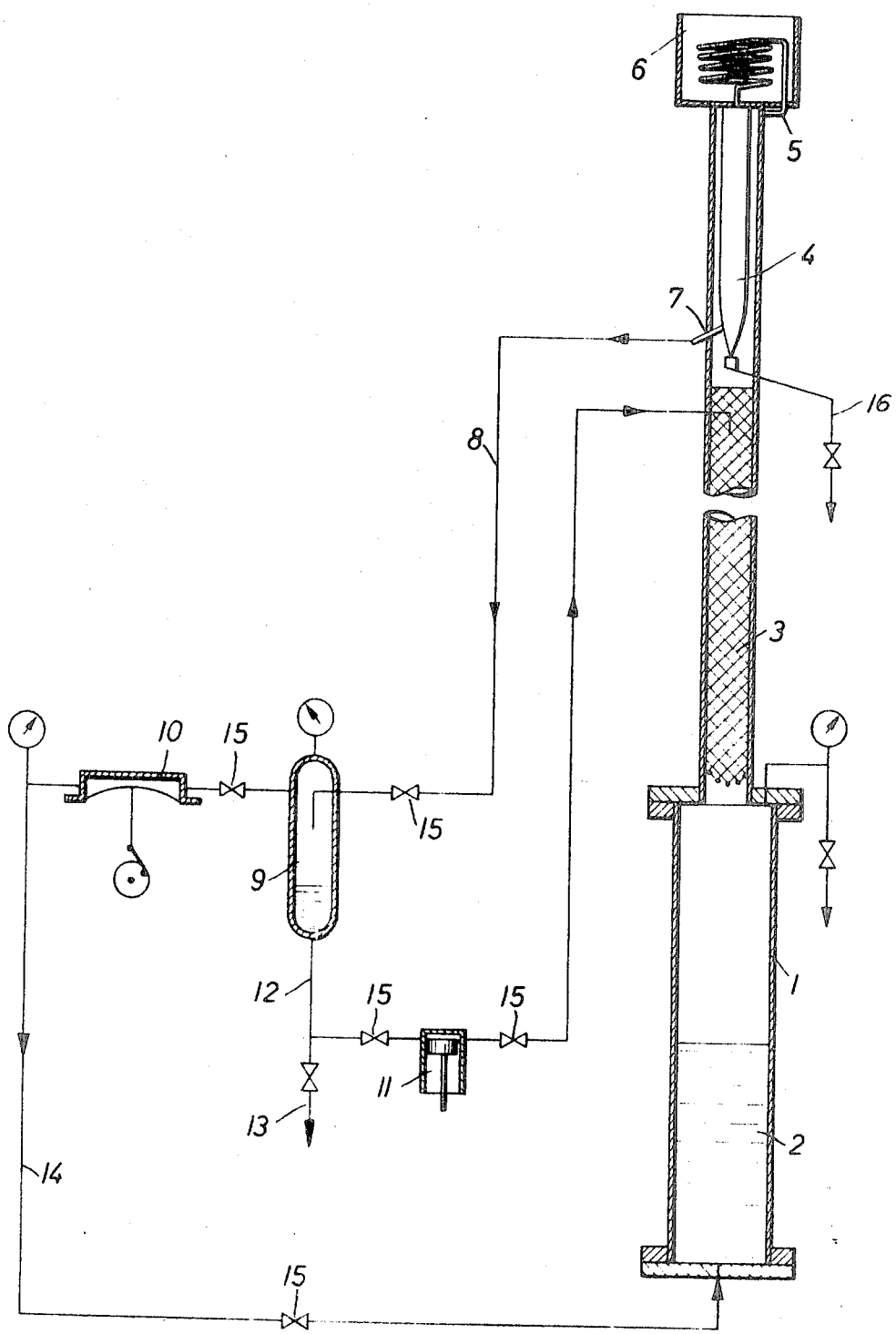

3,597,464
PROCESS FOR THE PRODUCTION OF ALUMINUM ALKYL COMPOUNDS
Kurt Zosel, Oberhausen, Germany, assignor to Studiengesellschaft Kohle m.b.H., Mulheim (Ruhr), Germany
Continuation of abandoned application Ser. No. 436,176, Mar. 1, 1965. This application May 19, 1969, Ser. No. 828,427
Claims priority, application Austria, Mar. 6, 1964, A 1,977/64
Int. Cl. C07f 5/06
U.S. Cl. 260—448A 24 Claims

ABSTRACT OF THE DISCLOSURE

A process for the separation of mixtures of aluminum trialkyls having alkyl groups of different chain lengths to produce a fraction having alkyl groups of more uniform chain length which comprises contacting the mixture with an inert gas which is under super-critical conditions of temperature and pressure and inert to aluminum trialkyls under the process conditions thereby taking up at least part of the mixture in the supercritical gas and recovering from the gas aluminum trialkyl taken up thereby.

This application is a continuation of application, Ser. No. 436,176, filed Mar. 1, 1965, and now abandoned.

This invention relates to a process for the production of aluminum alkyl compounds and hydrocarbon compounds derived therefrom.

The addition of olefins, especially alpha olefins to compounds of aluminum to form organoaluminum compounds containing alkyl groups is long known and originates with K. Ziegler and cooperators. Among the great number of publications dealing with the subject are the fundamental papers in "Zeitschrift fuer Angewandte Chemie" 64 (1952), pp. 323–9; "Brennstoffchemie," vol. 33, No. 11/12, pp. 193–200, and German Pats. 878,560, 964,642, 1,034,169, and 1,162,368.

This reaction is of particular importance for the reaction of ethylene with aluminum compounds having hydrogen or alkyl groups on the aluminum. Ethylene is capable of building up alkyl groups at these sites of the aluminum compounds, these alkyl groups containing more than only one ethylene unit. This reaction is referred to in the art as growth reaction and has commercial importance today in the production of hydrocarbon compounds having an average carbon number in the range of, for example, $C_{10}$ to $C_{30}$.

It was recognized early in carrying out the works leading to the growth reaction that not only alkyl groups may be grown on the aluminum, but that it is also possible to split off from the aluminum hydrocarbon compounds which are based on these alkyl groups. For example, it is possible to split off alpha olefins which correspond to the alkyl groups grown in their chain length. This cleavage may especially be effected by treatment of the growth product with an olefin and is generally referred to in the art as displacement reaction. The growth and displacement reactions may take place concurrently. It is also possible, however, to carry out these reactions at different times as described, for example, in German Pat. 1,034,169. In a first stage of this process, the aluminum compound is built up with ethylene to an average carbon number desired of the resultant alkyl groups which, for example, are then split off from the aluminum in the form of primarily formed alpha olefins by another treatment with ethylene or another olefin, but now under displacement conditions. Another possibility of further treatment of the growth product involves oxidation of the resultant aluminum alkyl compounds to form the corresponding alkoxy compounds from which, e.g. by hydrolysis, corresponding fatty alcohols may be obtained.

The alkyl groups formed in the growth reaction and consequently the hydrocarbon compounds obtained therefrom by displacement or oxidation and hydrolysis are subject to statistical principles with respect to their chain length. For example, when directing the growth reaction to an average carbon number of $C_{10}$ alkyl groups, a considerable amount of the growth product will be obtained with lower alkyl groups and also with higher alkyl groups. The formation of the higher alkyl groups is not considered as a disadvantage in practice since valuable products high in demand can be prepared therefrom. However, the formation of the lower alkyl groups is disadvantageous and yield-reducing. In the displacement reaction, the corresponding lower alpha olefins are formed. There is, at least today, no economically attractive use for these lower alpha olefins. This is a heavy burden to the economy of the process.

This disadvantage would be overcome if it would be possible to separate from the growth product the aluminum compounds having an undesirably low carbon number. It would then be possible to subject to the displacement reaction only that portion of the growth product which has the carbon number desired. Those aluminum compounds which are not yet sufficiently "grown" could be returned into the growth reaction where the extension desired of the chains would be effected in the alkyl group.

However, such a process, however desirable it may be, could not be carried out in practice up to the present because separation of the growth product in the manner described above was impossible so far. This is due, on the one hand, to the high boiling points in connection with thermal instability of the aluminum alkyl compounds formed and, on the other hand, to the small differences in volatility between the compounds to be separated.

This difficulty of separating aluminum alkyl compounds is by no means restricted to the synthesis described above according to the growth reaction, but the necessity is frequently encountered throughout the organoaluminum chemistry to separate aluminum alkyls containing alkyl groups of different sizes. In a number of situations, especially in case of the relatively low aluminum alkyl compounds, this is achieved to some extent by vacuum distillation on a column, but this operation is invariably difficult to govern. Due to the sensitivity to air of the aluminum alkyl compounds, such a vacuum distillation is connected with considerable hazards because there is the possibility that, in case of a leakage of the distillation equipment, air penetrates into the inner space filled with aluminum alkyl vapors. This separation by distillation is anyhow largely restricted by the thermal instability of aluminum alkyl compounds. Cleavage of olefins and consequently decomposition of the compounds will readily occur. Certainly, the difficulties will in part be due also to the fact that true mixtures of uniform aluminum alkyls do not exist at all. For example, when combining equal parts of aluminum triethyl and aluminum tributyl, at best only a few percent of the materials will remain what they are. They are chiefly converted by alkyl exchange into the mixed compounds, i.e. aluminum dibutyl ethyl and aluminum diethyl butyl. This aggravates the separation.

This problem has already been dealt with by the prior art. Reference is made, for example, to "Bulletin de la Société Chimique de France," No. 1 (1956), pp. 4 et seq. The present invention shows a new route permitting simple separation of aluminum alkyl compounds, especially of aluminum trialkyls having alkyl groups containing up to about 10 carbon atoms.

Accordingly, it is an object of the present invention to provide a process for the separation of mixtures of different aluminum trialkyls containing alkyl groups of different chain lengths, the process comprising treating the starting mixture with a gas which is under supercritical conditions of temperature and pressure and which is inert to aluminum alkyls under the process conditions thereby taking up at least part of the mixture in the supercritical gas and separating therefrom the individual aluminum trialkyls by depressurization and/or increasing the temperature.

Thus, the process of the invention utilizes features which are described in the earlier filed patent U.S. application Ser. No. 359,680, filed Apr. 14, 1964, and now abandoned, replaced by continuation application Ser. No. 880,475, filed Dec. 9, 1969 or in Belgian Pat. 646,641 and in the published Dutch patent application 6,404,125. These teachings are based on the fact that gases under supercritical conditions, i.e. at supercritical pressure and supercritical temperature, are capable on principle of taking up organic compounds and compounds containing organic groups among which are also the aluminum alkyl compounds dealt with in this application. The extent to which these compounds are taken up by the supercritical gas or, in other words, the extent to which the supercritical gas may be loaded with the compounds taken up, is dependent upon the particular compound. It appeared in the present case that the readiness of the resultant aluminum trialkyls to be taken up in the supercritical gas is the greater the shorter the alkyl groups.

It has been shown in the earlier filed protective right mentioned above and dealing with separation processes carried out by means of a supercritical gas phase that the amount of the particular substance to be taken up in the supercritical gas increases as the temperature in the supercritical range approaches the critical temperature and as the pressure in the supercritical range increases. Consequently, it is preferred within the scope of this work to operate at a combination of temperature and pressure conditions which combines the temperatures near the critical temperature and pressures above the critical pressure. It is especially this combination which in this specification is understood to be in the "supercritical gas phase" according to the invention. The opening temperatures are preferably within the range up to 50° C. and especially up to about 20° C. above the critical temperature while the upper limit of the pressure is substantially determined by technological considerations.

Particularly important and characteristic in this separation process is the temperature condition described above. Since it is preferred to operate near the critical temperature, the selection of the particular supercritical gas phase used determines the operating temperature of the separation process. It has been described within the scope of the earlier filed specification that the nature per se of the gas is of minor importance for the phenomenon of the loading with the classes of substances described. It is essential, of course, that no undesirable reactions between the separating gas and the compounds being separated will occur. Accordingly, purely organic gas phases such as lower hydrocarbon compounds under supercritical conditions are particularly well suited for the process of the invention. Essential for the selection are the critical constants and especially the critical temperature of the compound used under supercritical conditions which in fact largely determines the operating conditions of the separation process. It is an essential advantage of the new process that when properly selecting the compound used as the separating agent the separation process can be carried out with optimum results at low temperatures ranging, for example, around room temperature or at slightly elevated temperatures. For example, ethylene (critical temperature 9.7° C.) or ethane (critical temperature, about 32° C.) lend themselves for this mode of operation. It is possible when using these compounds to effect the separation at temperatures sufficiently low to prevent undesirable alterations on the aluminum alkyl from taking place.

To separate the mixture of aluminum trialkyls, all or only part of the mixture may be taken up in the supercritical gas phase. Even if only part of the mixture is taken up, the portion taken up may consist of a mixture of a plurality of aluminum trialkyls. The process described in the earlier filed specification mentioned above permits especially also the separation into its components of a mixture of substances present in the supercritical gas phase. This separation from the supercritical gas phase may be effected in a simple manner by partial and preferably stepwise increase in temperature and/or depressurization. A much more efficient separation is possible by the fractionation process, it being particularly preferred in accordance with the invention to operate in the sense of the teaching of the earlier filed specification by removing from the supercritical gas the aluminum trialkyls taken up therein, contacting in an exchange zone at least part of the material removed with the loaded gas stream under supercritical conditions for the gas used, passing the loaded gas stream and the previously separated material in countercurrent flow relation in said exchange zone, and recovering the individual aluminum trialkyls from the exchange zone and/or from the gas stream after the same has left the exchange zone.

For details of the take-up, separation and recovery in and from the supercritical gas phase, reference is made to the disclosure of the earlier filed patent application mentioned above. At this place, attention is merely briefly called to the fact that the separation is possible by an increase in temperature and/or depressurization, substantially complete separation of the portions of material taken up by the supercritical conditions being achieved by reduction of the pressure to a value below the critical pressure.

Aluminum trialkyls having alkyl groups containing up to 10 carbon atoms are particularly amenable to the fractionation described above. Thus, for example, it is possible to separate aluminum tributyl from aluminum trihexyl and aluminum trioctyl or to separate these compounds from the other aluminum trialkyls. Similarly, it is possible to separate substantially all of these lower aluminum trialkyls from aluminum trialkyls having higher alkyl groups. It will still be explained that this constitutes a particularly important potential separation for commercial practice. It is surprising that it is possible to separate the pure aluminum trialkyl compounds from, for example, a mixture of aluminum tributyl, aluminum trihexyl and aluminum trioctyl because it had to be expected that considerable amounts of mixed compounds are formed upon combination of these compounds by an immediately occurring exchange of alkyl groups. It appeared very surprisingly that the separation of the pure compounds is possible despite this exchange and obviously by re-disproportionation. As a matter of fact, in the fractionation process, the compound which is most readily taken up is always recovered as the first product of the separation so that backshifting of the alkyl groups from the mixed compounds to the alkyl compounds having uniform alkyl groups takes place by discharge of that aluminum trialkyl compound which is most readily taken up. Those aluminum trialkyls having the lowest carbon number in the alkyl groups are invariably most readily taken up so that it is possible in the fractionation to effect separation into fractions having increasing carbon numbers in the alkyl groups.

In a particular embodiment of the process of the invention, exactly this effect of disproportionation and shifting of alkyl groups is utilized, it being possible to subject to the process aluminum alkyl compounds which, as represented by their formulae, should be built up uniformily with alkyl groups which are different from one another. Actually, such an aluminum trialkyl compound represents a mixture of various alkyl compounds which is formed by the exchange of alkyl groups. If such a compound is subjected to the separation process of the invention, it is possible to recover the compounds, the formation of which is theoretically conceivable by disproportionation and exchange of alkyl groups, in fractions ordered according to increasing carbon numbers in the alkyl groups. Very important applications for the synthesis of organic compounds by means of organoaluminum compounds result herefrom. For example, it is known that olefins can be added to diethyl aluminum hydride. This addition proceeds under rather mild conditions and, when using olefins having more than 2 carbon atoms, results in an aluminum trialkyl having different alkyl groups. When subjecting this compound to the separation process of the invention, it is possible initially due to exchange of alkyl groups to separate uniform aluminum triethyl and thereafter uniform trialkyl aluminum is recovered, the alkyl groups of which correspond to the olefin introduced in the synthesis.

A particularly important case is as follows: It is possible to add octadiene to aluminum diisobutyl hydride under rather mild conditions using excess octadiene to form the compound

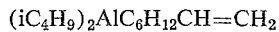

It is possible by the new process to separate from this compound aluminum triisobutyl which is formed from the compound shown above by spontaneous alkyl group exchange. The residue consists of uniform trioctenyl aluminum which in turn can be taken up in the supercritical gas phase and passed over. Thus, the new process provides the possibility to obtain trioctenyl aluminum which is a very sensitive compound in pure form. The formation of this compound by conventional processes is very difficult because the aluminum compound is simultaneously an alpha olefin so that the known dimerization of the terminal vinyl groups may occur if great care is not exercised in operation, which would largely detract from the value of the reaction products. Trioctenyl aluminum and other aluminum alkenyl compounds which are unsaturated in a corresponding manner are very attractive compounds because it is possible to obtain therefrom the homologous alpha, omega diolefins by growth and subsequent displacement. The process of the invention, when properly selecting the separating gas, e.g. when using ethylene or ethane, works practically at as low as room temperature and permits the preparation of this new class of compounds in pure form without any complication.

The new separation process may, however, be used also within the scope of the so-called growth reaction which was described above and wherein low aluminum trialkyls, especially aluminum triethyl or aluminum tripropyl, are reacted with ethylene to form aluminum trialkyls having higher alkyl groups. As mentioned above, the chain length of these alkyl groups formed is subject to statistical principles, which results in the disadvantages described above. However, it is now possible by means of the new process to separate the still inadequately grown organoaluminum compounds from the main product desired so that, especially with recycling of this still inadequately grown portion, an antistatistical synthesis of alkyl groups and consequently of hydrocarbon compounds to be obtained therefrom in the sense of the known growth and displacement reactions has become possible.

Accordingly, the invention also comprises as one embodiment a process for the preparation of higher aluminum alkyl compounds by the so-called growth reaction with antistatistical distribution of chain lengths in the alkyl groups grown, the process comprising treating a growth product with a gas which is under supercritical conditions of temperature and pressure thereby taking up in said gas the undesirable lower growth products, separating the gas phase thus loaded from the growth product and preferably returning the lower growth products to the growth reaction.

The lower growth products which are undesirable in practice range from aluminum tributyl on up to approximately aluminum trioctyl or aluminum trinonyl in the case of growing odd-numbered alkyl groups by working with aluminum tripropyl as the starting material. Just these relatively low aluminum trialkyl compounds are capable of being separated without any difficulty from the higher growth products by the process of the invention. In doing so, it is not even necessary to subdivide in itself this undesirably low fraction. It may be returned as such to the growth reaction. However if desired, it may be separated.

Lower hydrocarbon compounds, especially ethylene and ethane, have been found to be particularly suitable for the separation of aluminum trialkyl compounds. Their low critical temperatures permit a very mild treatment of the aluminum trialkyl mixture.

It is particularly preferred within the scope of the separation described above following a growth reaction to use ethylene as the supercritical gas phase. This means that the same gas, i.e. ethylene, may be used in the growth reaction and in the separation, which, of course, results in considerable simplifications of the process. The product grown in the first process stage with ethylene is treated with the same olefin in a subsequent separation stage effected merely at lower temperatures under supercritical conditions thereby taking up in the supercritical ethylene that portion of the product which has not yet been grown sufficiently, which portion is separated from the portions desired of the growth product and returned into the growth reaction at a higher temperature.

It is by no means necessary for this separation to take up in the supercritical gas phase only the undesirably low growth products. It is also possible to take up a higher portion of the growth product in the supercritical gas and then pass the thus loaded gas to the separation process in which the undesirable portions are then separated from the sufficiently grown portions.

A specific embodiment of the new process is shown in the appended drawing which represents diagrammatically the process cycle.

The stock vessel 1 contains a certain amount of a mixture of substances 2 to be separated. Mounted at the top of the stock vessel 1 is an exchange zone 3 which in the present case is constructed as a packed column. On the top of this packed column there is in turn mounted a fiinger-like separator 4 which is hollow in its interior, the interior communicating with the surrounding space via line 5. Line 5 is then passed through a heating device 6 permitting heating of the gas stream flowing through line 5. The finger 4 is provided at its lower end with an outlet 7 through which the gas stream may be withdrawn from the interior of this finger. The gas stream is passed through line 8 to the depressurizing drum 9 which, on the one hand, is connected to the compression device 10 and, on the other hand, to the pump 11. Line 12 in which an outlet valve 13 is installed leads to the pump 11. The gas stream withdrawn from the depressurizing device 9 is passed through line 14 by means of the compression device 10 into the base of the vessel 1 and consequently through the mixture 2 of substances to be separated. Valves are indicated at 15. The temperature of the liquid 2 is maintained in the range above the critical temperature of the recirculating inert gas. The pump 10 forces the inert gas through the liquid 2 from below. While passing through the liquid, it is loaded, also at a pressure above the critical pressure, with part of this liquid. This loaded gas stream passes through the exchange zone 3 and thereafter strikes the finger 4 which is made of a material having high thermal conductivity. A considerable portion of the mixture of substances entrained by the inert gas stream is separated at the surface of this finger. The inert gas stream is passed through line 5, the heating device 6 and thence into the interior of the finger 4. In the heating device 6, the inert gas stream is heated and, when passing through the interior of the finger 4, it heats in turn the wall of this finger. Thus, the inert gas stream leaving the column 3 strikes the hot wall of the finger 4, is heated thereby and gives off a considerable portion of the compounds entrained which normally drop back onto the top of column 3. If desired, part of this condensate may be withdrawn via line 16. Due to the heat exchange between the inflowing and outflowing inert gas stream, only a minor or no additional extent of heating is necessary at 6 once the process has been set going.

The substantially unloaded inert gas stream is passed through the outlet 7 and into the depressurizing vessel 9 where the residual portions of entrained compound are separated by depressurization. They accumulate at the bottom of this separator 9 from where they may either be withdrawn as the product of the separation through 13 or at least partially returned to the top of the column 3 via pump 11. Total reflux is recommendable when starting the process until equilibrium has been established in the system. Thereafter, not more than part of the product separated in 9 is returned. The balance constitutes the product of the separation. The gas stream freed from the separated product is returned into the base of the unit 1 via the compression device 10.

EXAMPLE 1

In a separation unit of the type shown in Belgian Pat. No. 646,641 and in the accompanying drawing, a growth product of aluminum triethyl and ethylene having an average carbon number of about 9 is subjected to the separation. The growth product has been prepared at a gauge pressure of about 100 kgs./cm.$^2$ and a temperature of 150–160° C. The free olefins up to about $C_{12}$ have been separated from this growth product by distillation in conventional manner prior to the separation in accordance with the invention.

The growth product thus pretreated, in an amount of 7.9 kgs., is given into the vessel 1 of the accompanying drawing and this vessel is maintained at a bath temperature of 40° C. The supercritical gas phase used is ethane starting with pressures of about 60 kgs./sq.cm. gauge, these pressures being progressively increased during the course of the separation so that a gauge pressure of about 92 kgs./sq.cm. is reached at the end of the process. The maximum temperature in the finger 4 is 95° C. The product separated thereby at the finger 4 internally heated by the heated gas stream is returned into the column with a reflux ratio of about 4:1. In the depressurizing device 9, the pressure is reduced to 15 kgs./cm.$^2$ gauge by means of valve 15 installed in line 8. The separation process gives the following results.

First runnings in an amount of about 1 liter are obtained as the first fraction which contains the free olefins having a carbon number of $C_{14}$ to about $C_{20}$ present in the growth product. Thereafter, aluminum tributyl, aluminum trihexyl and aluminum trioctyl may be recovered in separate fractions. The yield of these insufficiently grown aluminum trialkyl compounds totals about 1 liter. The fractions contain small amounts of higher free olefins which pass over together with the aluminum trialkyl compounds. Those lower aluminum trialkyl fractions may be returned into the growth reaction. The residue of the separation process consists of the higher aluminum trialkyl compounds which may be processed by methods known per se to form alpha olefins or alcohols.

EXAMPLE 2

A mixture of 3 liters of aluminum-tri-n-butyl and 3 liters of aluminum-tri-n-octyl was given into the separation device shown in the figure. The supercritical gas phase used was ethylene. The vessel 1 and the exchange zone 3 were maintained at a temperature of about 20° C. The finger 4 had a temperature of about 50° C. The ethylene pressure used initially was 72 kgs./sq. cm. gauge and was increased to a gauge pressure of 120 atmospheres at the end of the separation. The pressure of the recirculated ethylene was reduced by the release valve 15 to a constant value of 20 atmospheres. The product thereby separated in tank 9 was withdrawn through valve 13. In this manner, the following fractions could be withdrawn successively from vessel 9: About 2.3 liters of 88% aluminum-tri-n-butyl, about 1.5 liters of an intermediate fraction. About 2.2 liters of an about 90% aluminum-tri-n-octyl remained in vessel 1 as the residue.

EXAMPLE 3

A mixture of 2 liters of aluminum triethyl, 3 liters of aluminum-tri-n-butyl and 3 liters of aluminum-tri-n-octyl was given into the separation device of FIG. 1. The supercritical gas used was ethylene. The temperature was about 20° C. in 1 and 3 and about 50° C. in finger 4. The starting pressure was 75 atm. and the final pressure 100 atm. The recirculating ethylene was released to a constant pressure of 25 atm. before it entered into vessel 9. The following fractions could be withdrawn in succession via valve 13:

(1) 0.5 liter of a 70 wt. percent aluminum triethyl
(2) 1 liter of a 55 wt. percent aluminum triethyl
(3) 1 liter of a 40 wt. percent aluminum triethyl
(4) 1 liter of a 30 wt. percent aluminum triethyl
(5) 1 liter of a 20 wt. percent aluminum triethyl
(6) 1.5 liters of an intermediate fraction.
Residue: 2 liters of 75 wt. percent aluminum-tri-n-octyl.

Under the pressure and temperature conditions used, substantially pure aluminum triethyl could not be separated from the mixture charged. The residue of about 2 liters consisted of an only 75 wt. percent aluminum-tri-n-octyl as compared with a 90 wt. percent aluminum-tri-n-octyl in Example 2. The separation is seemingly deleteriously affected by the presence of aluminum triethyl in the starting mixture.

EXAMPLE 4

A mixture of 1.5 liters of hexadecene, 1.5 liters of octadecene, 5.2 liters of eicosene and higher and 1.55 liters of aluminum-tri-dodecyl was given into the separation device shown in FIG. 1. The supercritical gas used was ethane. The temperature was 50° C. in 1 and 3 and about 98° C. in the finger 4. The initial pressure was 75 atm. and the final pressure 100 atm. The recirculating ethane was depressurized through valve 15 to 15 atmospheres at the beginning of the separation and to about 40 atmospheres at the end of the separation. The transition was effected continuously during the separation.

The following fractions could be withdrawn in succession via valve 13:

About 1 liter of hexadecene
About 1 liter of an intermediate fraction
About 1 liter of octadecene
About 3 liters of an olefin mixture up to $C_{30}$-ene This olefin mixture did not yet contain aluminum-tri-dodecyl.

About 1 liter of an intermediate fraction, higher olefins in mixture with aluminum-tri-dodecyl, about 1.2 liters of almost pure aluminum-tri-dodecyl.

This run shows that, from a mixture of aluminum-tri-dodecyl and higher olefins, the olefins up to about $C_{30}$ can be separated from the organoaluminum compound. Thus, it is also possible in this manner to separate the olefins extensively from a higher growth product so that a substantially olefin-free growth product is obtained.

EXAMPLE 5

Aluminum-diisobutyl-octenyl in an amount of 6 kgs., prepared by addition of alpha, omega octadiene to aluminum diisobutyl hydride, are separated by the procedure and in the device described in the previous examples. The supercritical gas used is ethane. The temperature is 40° C. in 1 and 3 and 60° C. in the finger 4. The initial pressure is 60 atm. and the final pressure 100 atmospheres. The recirculating ethane is depressurized in vessel 9 to 20 atm. via valve 15. About 2.8 kgs. of extensively pure aluminum triisobutyl, then an intermediate fraction of 0.8 kg., and finally about 2.3 kgs. of substantially pure aluminum trioctenyl were obtained via valve 13 as the products of the separation process.

What is claimed is:

1. A process for the separation of mixtures of aluminum trialkyls having alkyl groups of different chain lengths to produce a fraction having alkyl groups of more uniform chain length, which comprises contacting the mixture with a gas which is under supercritical conditions of temperature and pressure and which is inert with respect to the aluminum trialkyls at the process conditions of temperature and pressure, and which selectively takes up from said mixture aluminum trialkyls of shorter chain length, thereby taking up at least part of the mixture in the supercritical gas and recovering from the gas aluminum trialkyl taken up by depressurization and/or increase in temperature, thereby effecting said separation.

2. The process of claim 1, wherein the starting material comprises aluminum trialkyls having alkyl groups containing up to 10 carbon atoms.

3. Process according to claim 1 wherein:
   (a) supercritical gas containing aluminum alkyls formed during said contacting is passed through an exchange zone for fractionation thereof to provide an exchange zone effluent supercritical gas containing aluminum trialkyls;
   (b) said exchange zone effluent supercritical gas containing aluminum trialkyls is treated to condense aluminum trialkyl therefrom;
   (c) contacting part of said condensate with supercritical gas fractionated in the exchange zone to effect said fractionation.

4. Process according to claim 3, wherein part of the aluminum trialkyl in said exchange zone effluent supercritical gas is condensed and used as reflux in the exchange zone, and the remaining supercritical gas containing aluminum trialkyl is treated to separate therefrom said fraction having alkyl groups of more uniform chain length.

5. Process according to claim 3, wherein the starting material comprises aluminum trialkyls having alkyl groups containing up to 10 carbon atoms.

6. Process according to claim 1, wherein said mixture includes at least one aluminum alkyl compound having alkyl groups which are different from one another, and said fraction is composed of aluminum trialkyl compound having alkyl groups which are the same.

7. Process according to claim 1, wherein said mixture includes at least one aluminum alkyl compound having alkyl groups which are different from one another including a first alkyl group which is of relatively short chain length and a second alkyl group which is of relatively long chain length, and said fraction is composed of aluminum trialkyl compound in which all the alkyl groups are of said relatively short length, and a further fraction is produced by separating as aforesaid, and said further fraction is composed of aluminum trialkyl compound in which all the alkyl groups are of said relatively long chain length.

8. Process according to claim 1, wherein the supercritical gas is a lower hydrocarbon compound.

9. Process according to claim 1, wherein the supercritical gas is ethylene or ethane.

10. A process for the separation of mixtures of aluminum trialkyls having alkyl groups of different chain lengths to produce a fraction having alkyl groups of more uniform chain length, which comprises contacting the mixture with a gas which is under supercritical conditions of temperature and pressure and which is inert with respect to the aluminum trialkyls at the process conditions of temperature and pressure, and which selectively takes up from said mixture aluminum trialkyls of shorter chain length, thereby taking up at least part of the mixture in the supercritical gas and recovering said fraction.

11. Process according to claim 10, wherein said fraction comprises aluminum trialkyls containing $C_4$–$C_9$ alkyl groups.

12. Process according to claim 10, wherein the supercritical gas is a lower hydrocarbon compound.

13. Process according to claim 10, wherein the supercritical gas is ethylene.

14. A process for the separation of mixtures of organo aluminum compounds of the formula:

wherein each of the substituents $R_1$, $R_2$ and $R_3$ is alkyl or alkenyl, and said mixture includes such compounds having different chain length of the substituents, to produce a fraction having substituents of more uniform chain length, which comprises contacting the mixture with a gas which is under supercritical conditions of temperature and pressure and which is inert with respect to the aluminum trialkyls at the process conditions of temperature and pressure, and which selectively takes up from said mixture aluminum trialkyls of shorter chain length, thereby taking up at least part of the mixture in the supercritical gas and recovering said fraction.

15. Process according to claim 14, wherein the supercritical gas is within about 50° C. of its critical temperature during said contacting.

16. In the production of organoaluminum compounds where a growth reaction is effected in a first process stage to produce a mixture of aluminum trialkyls having alkyl groups of different chain lengths, the improvement which comprises thereafter, in a second process stage, separating from said mixture a fraction having alkyl groups of more uniform chain length by contacting the mixture with a gas which is under supercritical conditions of temperature and pressure and which is inert with respect to the aluminum trialkyls at the process conditions of temperature and pressure, and which selectively takes up from said mixture aluminum trialkyls of shorter chain length, thereby taking up a part of said mixture including said fraction in the supercritical gas, and separating the supercritical gas containing said fraction from the remaining portion of said mixture.

17. Process according to claim 16, wherein said fraction is separated from the supercritical gas.

18. Process according to claim 17, wherein said separation from the supercritical gas is effected by depressurization and/or increase in temperature.

19. Process according to claim 16, wherein the supercritical gas is a lower hydrocarbon compound.

20. Process according to claim 16, wherein the supercritical gas is ethylene or ethane.

21. In the production of organoaluminum compounds where a growth reaction is effected in a first process stage to produce a mixture of aluminum trialkyls having alkyl groups of different chain lengths, the improvement which comprises thereafter, in a second process stage, separating from said mixture a fraction having alkyl groups of more uniform chain length by contacting the mixture with a gas which is under supercritical conditions of temperature and pressure and which is inert with respect to the aluminum trialkyls at the process conditions of temperature and pressure, and which selectively takes up from said mixture aluminum trialkyls of shorter chain length, thereby taking up at least part of the mixture in the supercritical gas and recovering said fraction therefrom.

22. Process according to claim 21, wherein said separation is effected by depressurization and/or increase in temperature.

23. Process according to claim 21, wherein the supercritical gas is a lower hydrocarbon gas.

24. Process according to claim 21, wherein the supercritical gas is ethylene or ethane.

References Cited

UNITED STATES PATENTS

| | | | |
|---|---|---|---|
| 2,863,896 | 12/1958 | Johnson | 260—448A |
| 2,889,385 | 6/1959 | Catterall et al. | 260—448AX |
| 3,007,852 | 11/1961 | Hunter et al. | 203—49 |
| 3,180,881 | 4/1965 | Zosel et al. | 260—448A |
| 3,207,771 | 9/1965 | Zosel | 260—448A |
| 3,218,343 | 11/1965 | Acciarri et al. | 260—448A |
| 3,309,295 | 3/1967 | Cahn et al. | 203—49X |
| 3,326,953 | 6/1967 | Gautreaux | 260—448A |
| 3,326,954 | 6/1967 | Gautreaux | 260—448A |
| 3,328,447 | 6/1967 | Kottenhahn | 260—448A |
| 3,352,940 | 11/1967 | Linden et al. | 260—683.15 |
| 3,412,126 | 11/1968 | Gautreaux | 260—448A |

FOREIGN PATENTS

| | | | |
|---|---|---|---|
| 940,182 | 10/1963 | Great Britain | 260—448A |
| 6,404,125 | 10/1964 | Netherlands. | |

TOBIAS E. LEVOW, Primary Examiner

H. M. S. SNEED, Assistant Examiner